(12) United States Patent
Yang et al.

(10) Patent No.: US 9,701,224 B2
(45) Date of Patent: Jul. 11, 2017

(54) CAR SAFETY SEAT

(71) Applicant: National Tsing Hua University, Hsinchu (TW)

(72) Inventors: Chien Yang, Taitung County (TW); Te-Hung Chen, Taipei (TW); Mao-Jiun Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 14/887,343

(22) Filed: Oct. 20, 2015

(65) Prior Publication Data
US 2017/0043684 A1 Feb. 16, 2017

(30) Foreign Application Priority Data
Aug. 11, 2015 (TW) .............................. 104126119 A

(51) Int. Cl.
*B60N 2/28* (2006.01)

(52) U.S. Cl.
CPC .... *B60N 2/2812* (2013.01); *B60N 2002/2818* (2013.01)

(58) Field of Classification Search
CPC .......... B60N 2/2812; B60N 2002/2818; B60R 2022/1818
See application file for complete search history.

(56) References Cited

U.S. PATENT DOCUMENTS

| 4,882,213 | A | * | 11/1989 | Gaddis | A47C 31/116 297/219.1 |
| 5,135,285 | A | * | 8/1992 | Dukatz | B60R 22/105 297/112 |
| 5,340,198 | A | | 8/1994 | Murphy et al. | |
| 5,449,223 | A | * | 9/1995 | Miculici | B60R 22/20 280/801.2 |
| 5,472,260 | A | * | 12/1995 | Czapski | B60N 2/3084 297/112 |
| 5,899,534 | A | * | 5/1999 | Gray | B60N 2/3084 297/238 |
| 7,819,485 | B2 | * | 10/2010 | Hartenstine | A47D 13/105 297/250.1 |

(Continued)

FOREIGN PATENT DOCUMENTS

CN 2630034 8/2004
TW 201341226 10/2013

*Primary Examiner* — Philip Gabler
(74) *Attorney, Agent, or Firm* — Jianq Chyun IP Office

(57) ABSTRACT

A car safety seat includes a seat body and at least one safety belt. The seat body has at least one slot structure, wherein the slot structure includes a plurality of positioning slots and a plurality of guiding slots. The positioning slots are arranged with intervals in sequence, wherein each of the positioning slots has a first section and a second section opposite to each other. Each of the positioning slots is connected with another adjacent one of the positioning slots through one of the guiding slots, and each of the guiding slots extends from the first section of one of the positioning slots to the second section of another adjacent one of the positioning slots. The safety belt penetrates through any one of the positioning slots, wherein the safety belt is adapted to move along the corresponding guiding slot to reach another adjacent one of the positioning slots.

10 Claims, 6 Drawing Sheets

(56) References Cited

U.S. PATENT DOCUMENTS

| | | | | |
|---|---|---|---|---|
| 8,672,403 B2* | 3/2014 | Mendis | ............... | B60N 2/2806 297/216.11 |
| 2005/0035635 A1* | 2/2005 | Hendrikus | ........... | B60N 2/2812 297/250.1 |
| 2012/0242129 A1* | 9/2012 | Gaudreau, Jr. | ...... | B60N 2/2812 297/256.16 |

* cited by examiner

CAR SAFETY SEAT

CROSS-REFERENCE TO RELATED APPLICATION

This application claims the priority benefit of Taiwan application serial no. 104126119, filed on Aug. 11, 2015. The entirety of the above-mentioned patent application is hereby incorporated by reference herein and made a part of this specification.

BACKGROUND OF THE INVENTION

Field of the Invention

The invention relates to a seat, and particularly relates to a car safety seat.

Description of Related Art

The safety belt attached on the car seat is mainly designed for the adult body, so that it is unable to provide safety and protection for children, and thus the car safety seat suitable for children is gradually developed. The car safety seat is generally mounted on the backseat of the car so as to provide seats for children, and the car safety seat with the exclusive safety belt position the body of children effectively. In response to the growth of children's body, the height of the safety belt on the backrest of the seat of some of the car safety seats is designed as adjustable.

However, the method of adjustment of the safety belt of the car safety seat is generally comparatively inconvenient. The safety belt needs to be detached from the backrest of the seat first, and then the safety belt is reattached to the backrest of the seat at a different height. Therefore, the user's intention to adjust the safety belt of the car safety seat is decreased, so as to decrease the usage rate of the safety belt and a safety environment for children in a car ride cannot be provided. In addition, the safety belt of the car safety seat cannot be adjusted at the seating portion of the seat, so that children with bigger buttock and bigger pelvis cannot use the safety belt of the car safety seat comfortably.

SUMMARY OF THE INVENTION

The invention provides a car safety seat, a safety belt of the car safety seat is easily adjusted.

The car safety seat in the invention includes a seat body and at least one safety belt. The seat body has at least one slot structure, wherein the slot structure includes a plurality of positioning slots and a plurality of guiding slots. The positioning slots are arranged with intervals in sequence, wherein each of the positioning slots has a first section and a second section opposite to each other. Each of the positioning slots is connected with another adjacent one of the positioning slots through one of the guiding slots, and each of the guiding slots extends from the first section of one of the positioning slots to the second section of another adjacent one of the positioning slots. The safety belt penetrates through any one of the positioning slots, wherein the safety belt is adapted to move along the corresponding guiding slot to reach another adjacent one of the positioning slots.

In one embodiment of the invention, the positioning slots are arranged with intervals in sequence along an arranging direction, an extending direction of each of the guiding slots is oblique to the arranging direction.

In one embodiment of the invention, the arranging direction is perpendicular to an extending direction of each of the positioning slots.

In one embodiment of the invention, the seat body includes a seating portion and a backrest connected to each other, the seating portion is located below the backrest, and at least one slot structure is formed at the backrest.

In one embodiment of the invention, the number of the at least one slot structure is plural, the number of the at least one safety belt is plural, the safety belts penetrate through the slot structures respectively.

In one embodiment of the invention, the second sections of one of the slot structures and the second sections of another one of the slot structures face each other, and each of the guiding slots extends obliquely from the first section of one of the positioning slots downwards to the second section of another adjacent one of the positioning slots.

In one embodiment of the invention, the seat body includes a seating portion and a backrest connected to each other, the seating portion is located below the backrest, and at least one slot structure is formed at the seating portion.

In one embodiment of the invention, the car safety seat includes a wrap member, wherein the wrap member wraps the safety belt.

In one embodiment of the invention, the width of each of the guiding slots is smaller than the width of each of the positioning slots.

In one embodiment of the invention, each of the guiding slots is connected to a connecting position of the corresponding first section, the connecting position and an end of the first section have a distance therebetween.

In one embodiment of the invention, each of the guiding slots is connected to a connecting position of the corresponding second section, the connecting position and an end of the second section have a distance therebetween.

Based on the above, in the car safety seat of the invention, the positioning slots which position the safety belt are connected to each other through the guiding slots, so that the user can move the safety belt to different positioning slot by simply applying a force to the safety belt to make the safety belt move through the guiding slot. Accordingly, the user is able to adjust the position of the safety belt quickly and easily without detaching the safety belt from the seat body, so as to increase the user's intention to adjust the safety belt of the car safety seat, and further increase the usage rate of the safety belt to provide a safety environment for children in a car ride.

In order to make the aforementioned and other features and advantages of the invention more comprehensible, embodiments accompanying figures are described in detail belows.

DESCRIPTION OF THE EMBODIMENTS

Figure 1:
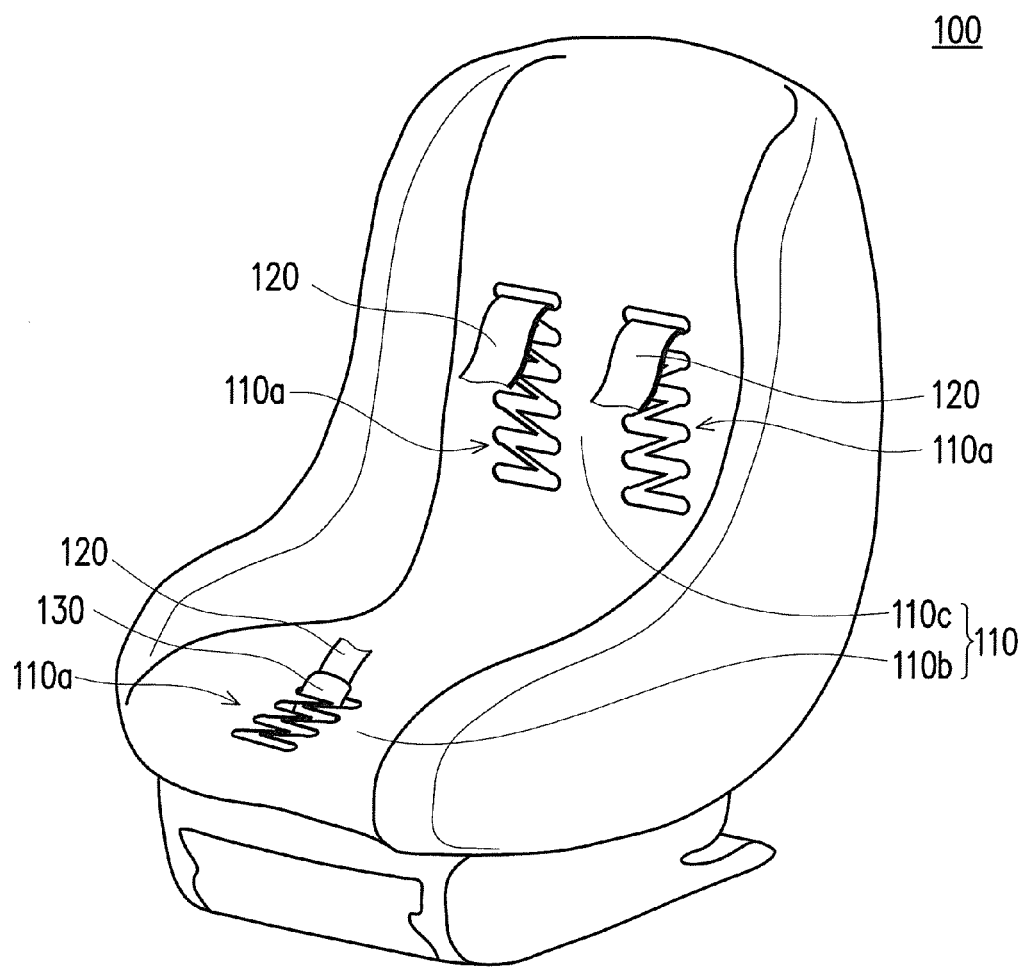
FIG. 1 is a schematic view of a car safety seat of one embodiment of the invention.

FIG. 1 is a schematic view of a car safety seat of one embodiment of the invention. Referring to FIG. 1, a car safety seat 100 of the present embodiment includes a seat body 110 and a plurality of safety belts 120 (depicted as three belts). The seat body 110 can be mounted on the backseat of the car so as to provide a seat for children. The seat body 110 includes a seating portion 110b and a backrest 110c connected to each other, the seating portion 110b is located below the backrest 110c so as to provide a seat for children, and the backrest 110c provides support for children's back. The seat body 110 has a plurality of slot structures 110a (depicted as three slot structures), wherein two slot structures 110a are formed at the backrest 110c, and one slot structure 110a is formed at the seating portion 110b. The safety belts 120 penetrate through the slot structures 110a so as to provide for children to use. In other embodiments, each of the slot structures 110a can also be formed at other appropriate positions of the seat body 110, the invention is not limited thereto.

Figure 2:
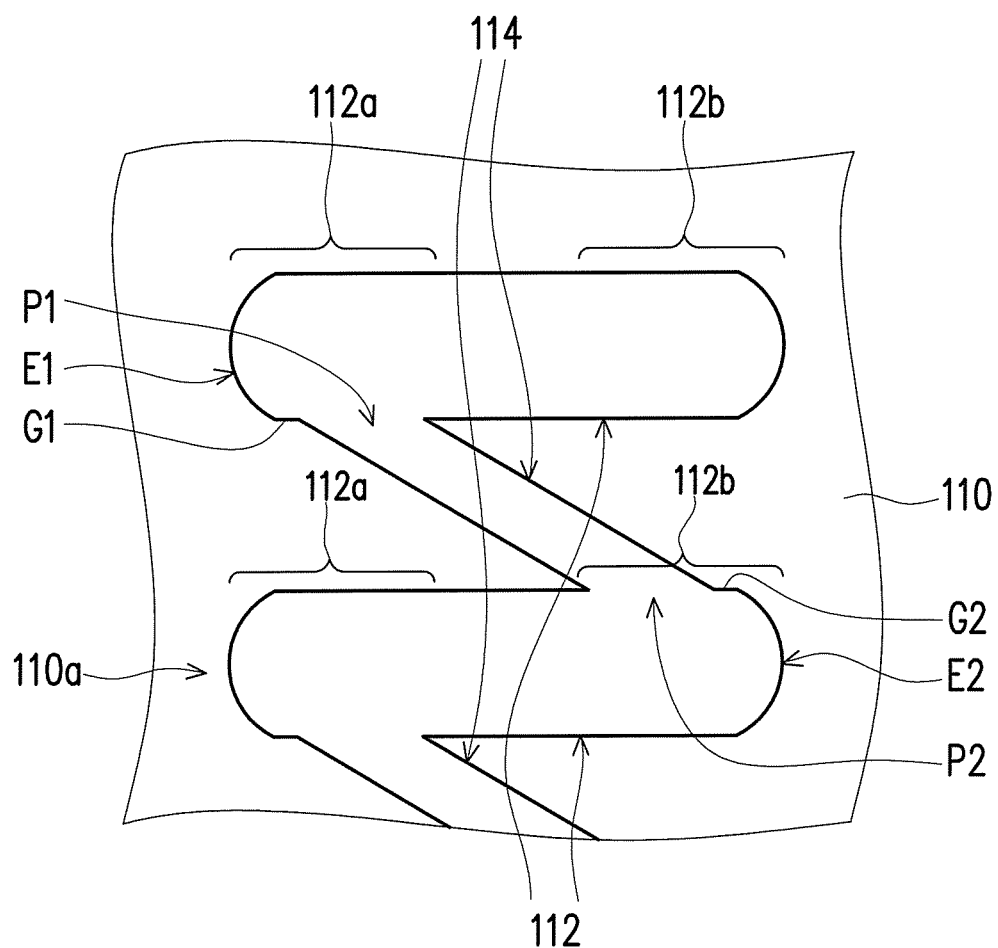
FIG. 2 is a partial schematic view of each of slot structures in FIG. 1.

FIG. 2 is a partial schematic view of each of slot structures in FIG. 1. Referring to FIG. 2, each of the slot structures 110a includes a plurality of positioning slots 112 and a plurality of guiding slots 114. Each of the safety belts 120 (as depicted in FIG. 1) can penetrate through one of the positioning slots 112 of the corresponding slot structure 110a. The positioning slots 112 are arranged with intervals in sequence, each of the positioning slots 112 has a first section 112a and a second section 112b opposite to each other. Each of the positioning slots 112 is connected with another adjacent one of the positioning slots 112 through one of the guiding slots 114, and each of the guiding slots 114 extends from the first section 112a of one of the positioning slots 112 to the second section 112b of another adjacent one of the positioning slots 112. Each of the safety belts 120 (depicted in FIG. 1) penetrates through any one of the positioning slots 112 of the corresponding slot structure 110a, and each of the safety belts 120 is adapted to move along the corresponding guiding slot 114 to reach another adjacent one of the positioning slots 112.

Under the above-mentioned disposition method, the positioning slots 112 which position the safety belt 120 are connected to each other through the guiding slots 114, so that the user can move the safety belt 120 to different positioning slot 112 by simply applying a force to the safety belt 120 to make the safety belt 120 move through the guiding slot 114. Accordingly, the user is able to adjust the position of the safety belt 120 quickly and easily without detaching the safety belt 120 from the seat body 110, so as to increase the user's intention to adjust the safety belt 120 of the car safety seat 100, and further increase the usage rate of the safety belt 120 to provide a safety environment for children in a car ride.

Furthermore, the above-mentioned positioning slot 112 and the guiding slot 114 are designed to adjust the position of the safety belt 120 of the car safety seat 100 in the present embodiment and the position of the safety belt 120 is not adjusted by an additional mechanical structure, so as to prevent children from being injured because of mishandling the said mechanical structure, and there is no need to perform the subsequent care and maintenance for the said mechanical structure. In addition, the positioning slots 112 and the guiding slots 114 which are used to adjust the safety belt 120 are not only disposed on the backrest 110c but also disposed on the seating portion 110b of the car safety seat 100 of the present embodiment. Accordingly, the safety belt 120 of the seating portion 110b can also be adjusted, so that children with bigger buttock and bigger pelvis can use the safety belt 120 of the car safety seat 100 comfortably.

Figure 3A:
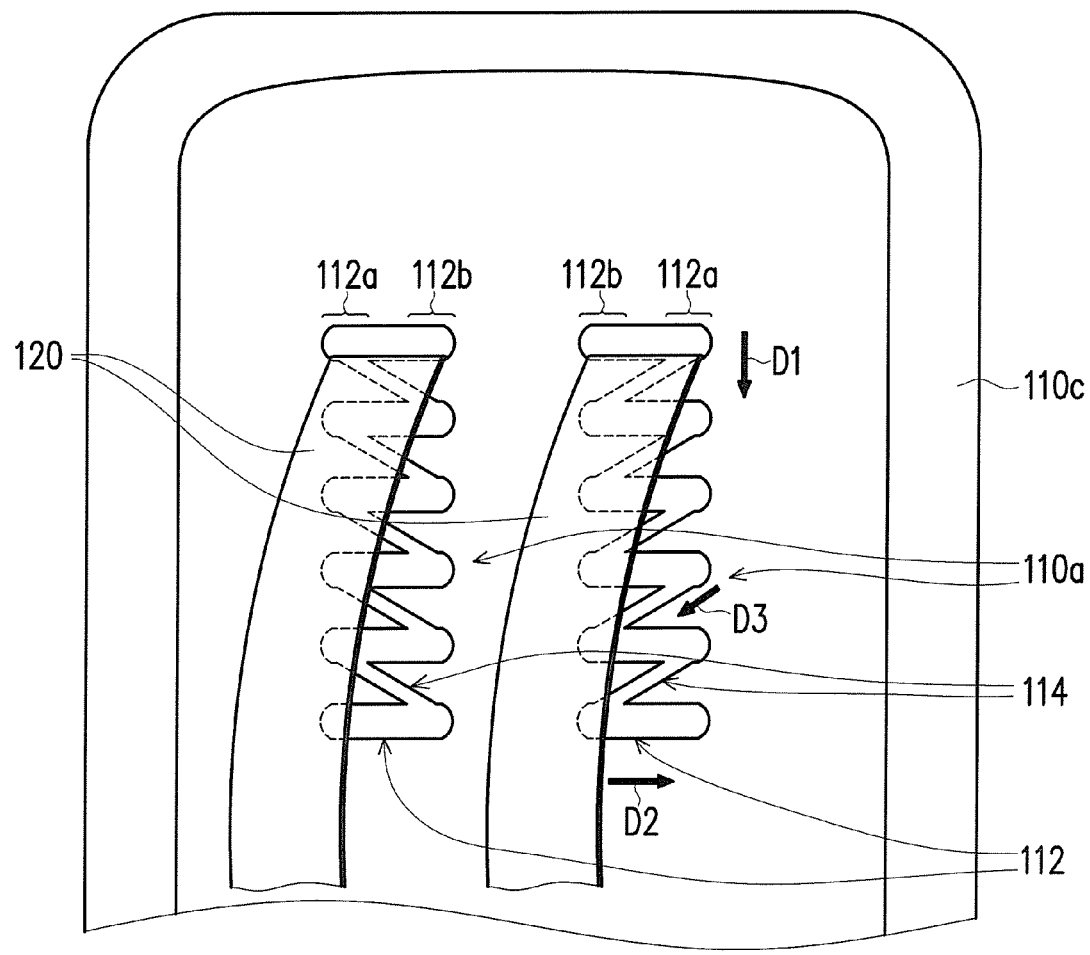
FIG. 3A to FIG. 3C depict a method of adjustment of safety belts in FIG. 1.
Figure 3B:
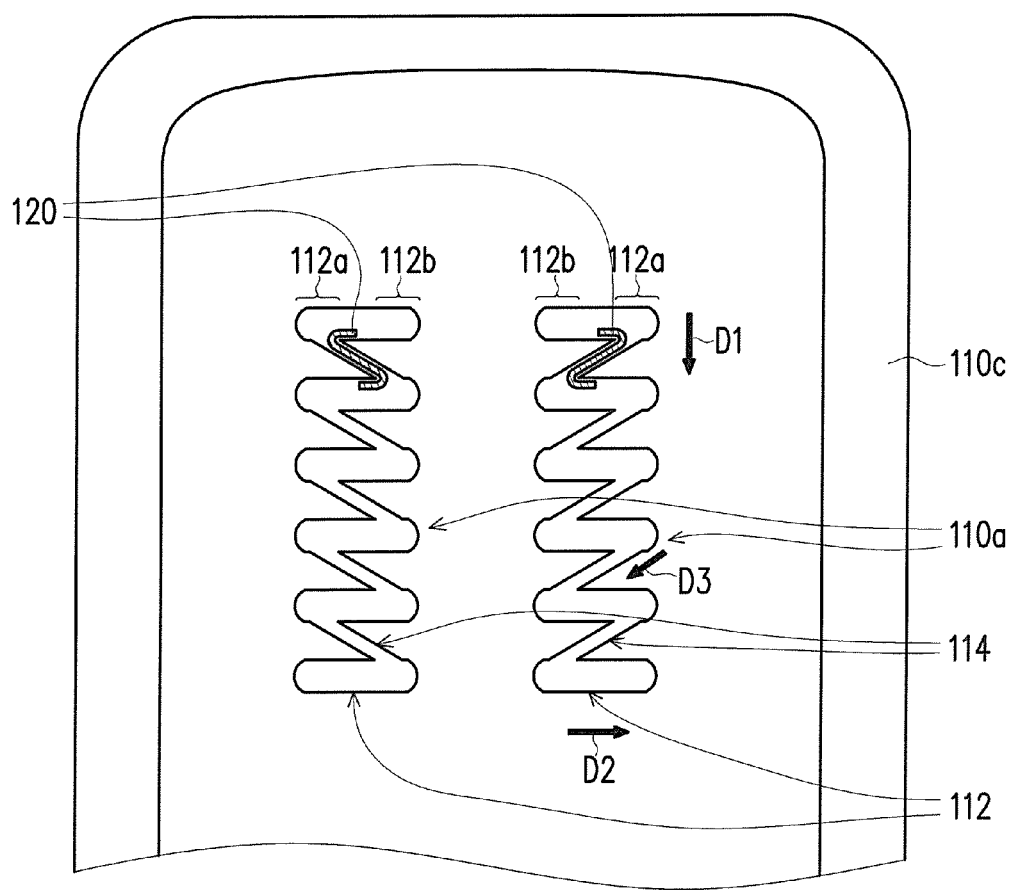
Figure 3C:
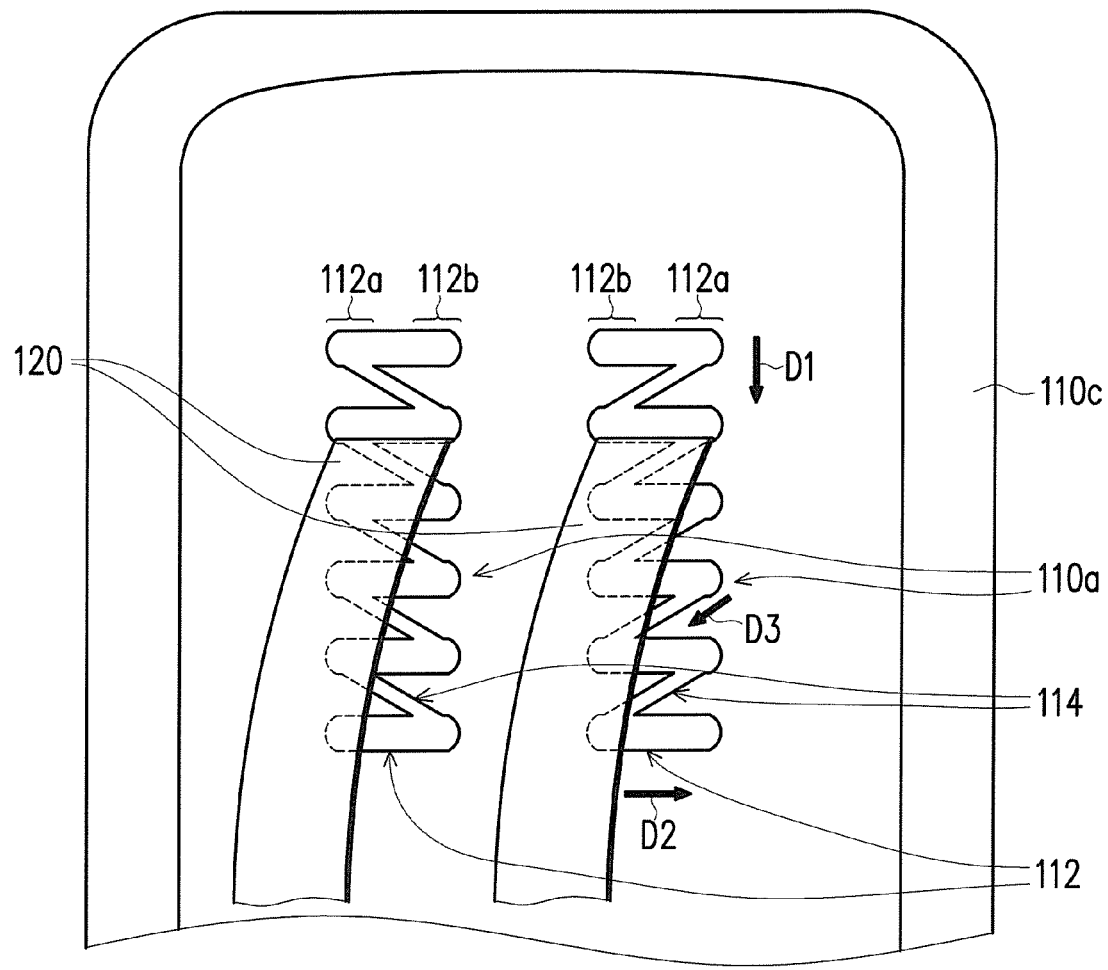

According to an example that there are two slot structures 110a on the backrest 110c, a method of adjustment of the safety belt 120 of the present embodiment is specifically described as following. FIG. 3A to FIG. 3C depict a method of adjustment of safety belts in FIG. 1. In order to make the drawings clearer, the safety belt 120 in the FIG. 3B is depicted in cross-sectional manner. Each of safety belts 120 as shown in FIG. 3B penetrates through the corresponding one of the positioning slots 112, and thus being positioned. When the user wants to adjust the position of the safety belts 120, the user can apply a force to each of the safety belts 120 so as to make each of the safety belts 120 move along the corresponding guiding slot 114 from the position shown in FIG. 3A to the position shown in FIG. 3B and then arrive another adjacent one of the positioning slots 112. The user can adjust each of the safety belts 120 to any one of the positioning slots 112 of the corresponding slot structure 110a based on this method.

The disposition method of the slot structures of the present embodiment is specifically described via drawings as following. Referring to FIG. 3A, in each of the slot structures 110a of the present embodiment, the positioning slots 112 are arranged with intervals in sequence along an arranging direction D1, the arranging direction D1 is perpendicular to an extending direction D2 of each of the positioning slots 112, and an extending direction D3 of each of the guiding slots 114 is oblique to the arranging direction D1. Each of the guiding slots 114 extends obliquely from the first section 112a of one of the positioning slots 112 downwards to the second section 112b of another adjacent one of the positioning slots 112. In addition, concerning two slot structures 110a on the backrest 110c, the second sections 112b of one of the slot structures 110a and the second sections 112b of another one of the slot structures 110a face each other. Namely, the second sections 112b are located at the inner side of the seat body 110, and the first sections 112a are located at the outer side of the seat body 110.

As described above, each of the guiding slots 114 extends downwards from the first section 112a at the outer side of the seat body 110, and each of the guiding slots 114 does not extend downwards from the second section 112b at the inner side of the seat body 110. Therefore, when a child pulls the safety belt 120 inwards and downwards so as to make the safety belt 120 move towards the inner side of the seat body 110, the safety belt 120 can be prevented from falling into the guiding slot 114 from the first section 112a and moving towards another one of the positioning slots 112. In addition, the width of each of the guiding slots 114 can be designed to be smaller than the width of each of the positioning slots 112 as shown in Figures, so as to prevent the safety belt 120 from falling into the guiding slot 114 unintentionally because the width of the guiding slot 114 is too large.

Referring to FIG. 2, in the present embodiment, each of the guiding slots 112 is connected to a connecting position P1 of the corresponding first section 112 a, the connecting position P1 and an end E1 of the first section 112a have a distance G1 therebetween. Therefore, when the safety belt 120 is pulled to the first section 112a by a child, the safety belt 120 is against the end E1 of the first section 112a because of the existence of the distance G1, and the safety belt 120 does not fall into the guiding slot 114 unintentionally. Similarly, each of the guiding slots 112 is connected to a connecting position P2 of the corresponding second section 112b, the connecting position P2 and an end E2 of the second section 112b have a distance G2 therebetween. Therefore, when the safety belt 120 is pulled to the second section 112b by a child, the safety belt 120 is against the end E2 of the second section 112b because of the existence of the distance G2, and the safety belt 120 does not fall into the guiding slot 114 unintentionally.

Figure 4:
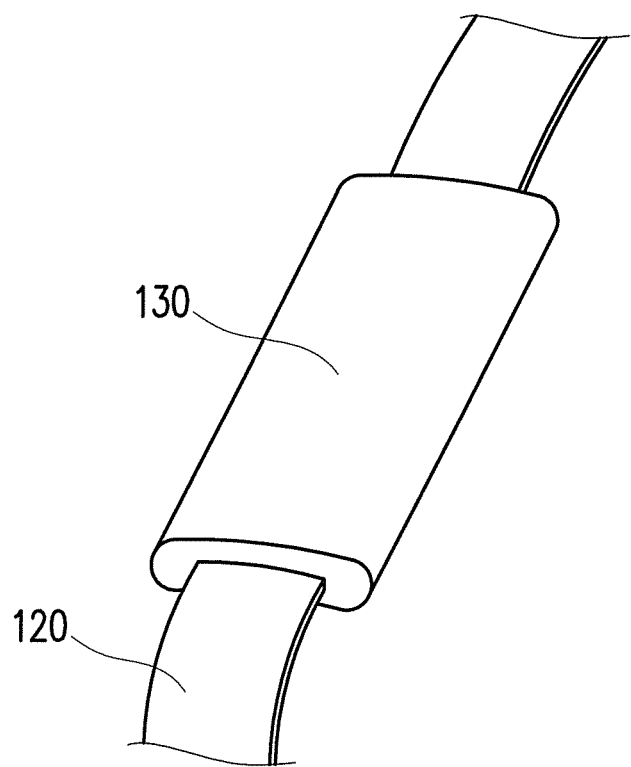
FIG. 4 is a schematic view of the safety belt in FIG. 1.

FIG. 4 is a schematic view of the safety belt in FIG. 1. Referring to FIG. 1 and FIG. 4, in the present embodiment, the car safety seat 100 further includes a wrap member 130, and the wrap member 130 wraps the safety belt 120 on the seating portion 110b so as to contact with the inner edge of the slot structure 110a on the seating portion 110b. Therefore, the force needed to adjust the safety belt 120 can be increased via the friction between the wrap member 130 and the inner edge of the slot structure 110a, so as to prevent the safety belt 120 from being pulled by a child and moving to another one of positioning slots 112 unintentionally. The material of the wrap member 130 can be cotton or other appropriate materials, the invention is not limited thereto.

In summary, in the car safety seat of the invention, the positioning slots which position the safety belt are connected to each other through the guiding slots, so that the user can move the safety belt to different positioning slot by simply applying a force to the safety belt to make the safety belt move through the guiding slot. Accordingly, the user is able to adjust the position of the safety belt quickly and easily without detaching the safety belt from the seat body, so as to increase the user's intention to adjust the safety belt of the car safety seat, and further increase the usage rate of the safety belt to provide a safety environment for children in a car ride. Furthermore, the above-mentioned positioning slot and the guiding slot are designed to adjust the position of the safety belt of the car safety seat in the invention and the position of the safety belt is not adjusted by an additional mechanical structure, so as to prevent children from being injured because of mishandling the said mechanical structure, and there is no need to perform the subsequent care and maintenance for the said mechanical structure. In addition, the positioning slots and the guiding slots which are used to adjust the safety belt are not only disposed on the backrest but also disposed on seating portion of the car safety seat of the present invention. Accordingly, the safety belt of the seating portion can also be adjusted, so that children with bigger buttock and bigger pelvis can use the safety belt of the car safety seat comfortably.

It will be apparent to those skilled in the art that various modifications and variations can be made to the structure of the invention without detaching from the scope or spirit of the invention.

What is claimed is:

1. A car safety seat, comprising:
    a seat body, having at least one slot structure, wherein the slot structure comprises:
        a plurality of positioning slots, arranged with intervals in sequence, wherein each of the positioning slots has a first section and a second section opposite to each other; and
        a plurality of guiding slots, wherein each of the positioning slots is connected with another adjacent one of the positioning slots through one of the guiding slots, each of the guiding slots straightly extends from the first section of one of the positioning slots to the second section of another adjacent one of the positioning slots, and each of the guiding slots is entirely located between the two corresponding positioning slots;
    at least one safety belt, penetrating through any one of the positioning slots, wherein the safety belt is adapted to move along the corresponding guiding slot to reach another adjacent one of the positioning slots; and
    a wrap member, wherein the wrap member wraps the safety belt, and the wrap member contacts with an inner edge of the slot structure such that a force for adjusting the safety belt is increased via a friction between the wrap member and the inner edge of the slot structure.

2. The car safety seat as recited in claim 1, wherein the positioning slots are arranged with intervals in sequence along an arranging direction, an extending direction of each of the guiding slots is oblique to the arranging direction.

3. The car safety seat as recited in claim 2, wherein the arranging direction is perpendicular to an extending direction of each of the positioning slots.

4. The car safety seat as recited in claim 1, wherein the seat body comprises a seating portion and a backrest connected to each other, the seating portion is located below the backrest, the at least one slot structure is formed at the backrest.

5. The car safety seat as recited in claim 1, wherein a number of the at least one slot structure is plural, a number of the at least one safety belt is plural, the safety belts penetrate through the slot structures respectively.

6. The car safety seat as recited in claim 5, wherein the second sections of one of the slot structures and the second sections of another one of the slot structures face each other, each of the guiding slots extends obliquely from the first section of one of the positioning slots downwards to the second section of another adjacent one of the positioning slots.

7. The car safety seat as recited in claim 1, wherein the seat body comprises a seating portion and a backrest connected to each other, the seating portion is located below the backrest, the at least one slot structure is formed at the seating portion.

8. The car safety seat as recited in claim 1, wherein a width of each of the guiding slots is smaller than a width of each of the positioning slots.

9. The car safety seat as recited in claim 1, wherein each of the guiding slots is connected to a connecting position of the corresponding first section, the connecting position and an end of the first section have a distance therebetween.

10. The car safety seat as recited in claim 1, wherein each of the guiding slots is connected to a connecting position of the corresponding second section, the connecting position and an end of the second section have a distance therebetween.

* * * * *